(12) United States Patent
Shimada et al.

(10) Patent No.: US 7,126,805 B2
(45) Date of Patent: Oct. 24, 2006

(54) SOLENOID DRIVING DEVICE

(75) Inventors: Satoshi Shimada, Wako (JP); Shinji Ohkuma, Wako (JP); Nobuharu Kuriki, Wako (JP); Nobuaki Takata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 216 days.

(21) Appl. No.: 10/801,650

(22) Filed: Mar. 17, 2004

(65) Prior Publication Data
US 2004/0207377 A1 Oct. 21, 2004

(30) Foreign Application Priority Data
Apr. 10, 2003 (JP) ............................. 2003-106075
Apr. 21, 2003 (JP) ............................. 2003-115369

(51) Int. Cl.
H01H 9/00 (2006.01)
H01H 47/00 (2006.01)
H01H 47/32 (2006.01)

(52) U.S. Cl. ..................................... 361/154
(58) Field of Classification Search ................. 361/154
See application file for complete search history.

(56) References Cited

U.S. PATENT DOCUMENTS

| | | | |
|---|---|---|---|
| 5,790,364 A * | 8/1998 | Mikami et al. | 361/154 |
| 5,978,201 A * | 11/1999 | Fujiwara et al. | 361/153 |
| 6,133,643 A * | 10/2000 | Lukich et al. | 290/40 A |
| 6,404,612 B1 * | 6/2002 | Pattantyus | 361/187 |
| 6,424,873 B1 * | 7/2002 | Przybylski | 700/42 |
| 6,462,927 B1 * | 10/2002 | Swinbanks | 361/146 |
| 6,744,615 B1 * | 6/2004 | Melbert et al. | 361/154 |
| 2001/0043450 A1 * | 11/2001 | Seale et al. | 361/160 |

FOREIGN PATENT DOCUMENTS

| | | |
|---|---|---|
| JP | 54-67762 U | 5/1979 |
| JP | 10-015456 A | 1/1998 |
| JP | 10-057867 A | 3/1998 |
| JP | 2001-135927 A | 5/2001 |
| JP | 2001-178186 | 6/2001 |
| JP | 2002-39231 | 2/2002 |

(Continued)

OTHER PUBLICATIONS

Notification of First Office Action dated Mar. 3, 2006.

*Primary Examiner*—Stephen W. Jackson
*Assistant Examiner*—Ann T. Hoang
(74) *Attorney, Agent, or Firm*—Westerman, Hattori, Daniels & Adrian, LLP.

(57) ABSTRACT

A device for driving a solenoid including a power supply, a switching element connected between the power supply and the solenoid in series therewith, a current circulating diode connected in parallel to the solenoid, a current detecting circuit for detecting an actual current flowing through the solenoid, and a PID computing unit for computing an on-duty value and an off-duty value according to a difference between a target current and the actual current detected and for outputting the on-duty value and the off-duty value. The device further includes a PWM duty driving unit for generating a PWM duty signal according to inputting of the on-duty value and supplying the PWM duty signal to the switching element to on/off control the switching element, and a reverse voltage applying circuit capable of applying a voltage of the power supply as a reverse voltage to the solenoid according to inputting of the off-duty value when the switching element is off.

15 Claims, 16 Drawing Sheets

FOREIGN PATENT DOCUMENTS

| | | |
|---|---|---|
| JP | 2002-93619 | 3/2002 |
| JP | 2002-225581 | 8/2002 |
| JP | 2002-227882 | 8/2002 |
| JP | 2002-237412 | 8/2002 |
| JP | 2002-303660 | 10/2002 |

* cited by examiner

SOLENOID DRIVING DEVICE

BACKGROUND OF THE INVENTION

1. Field of the Invention

The present invention relates to a device for driving a solenoid used in a torque transmitting mechanism or the like for an electronically controlled four-wheel drive vehicle or the like, and also to a control device for an electromagnetic actuator including the solenoid.

2. Description of the Related Art

For example, a torque transmitting mechanism or the like for an electronically controlled four-wheel drive vehicle includes a pair of right and left planetary gear sets and a pair of brake mechanisms for variably controlling the respective sun gears connected to the pair of planetary gear sets. Each brake mechanism includes a wet multiplate brake and an electromagnetic actuator for operating the multiplate brake. The electromagnetic actuator is composed of a core (yoke) having an annular groove, a solenoid inserted in the annular groove of the core, an armature opposed to the core with a given gap defined therebetween, and a piston integrally connected to the armature.

When a current is passed through the solenoid to energize the solenoid, the armature is attracted to the core by the solenoid, thereby generating a thrust. As a result, the piston integrally connected to the armature is operated to engage the multiplate brake, thereby generating a brake torque. By controlling the currents passing through the right and left solenoids according to a turning direction and a steering force or steering angle, output torques to be transmitted to the right and left rear axles can be variably controlled.

Generally carried out as a control method for a solenoid drive current is the combination of current feedback control using a PID controller and current control by a pulse width modulation (PWM) duty signal using a switching element and a current circulating diode. In this control method, the on-duty value as an output from the PID controller has an effective range of 0% to 100%. By adjusting the proportional term constant, integral term constant, and derivative term constant of the PID controller to optimum values, a steady-state deviation of a drive current (actual current) from a target current is eliminated, and a suitable overshoot is generated upon rising of the drive current.

In a control system mounted on a vehicle, however, the power supply voltage for the solenoid is generally a single power supply voltage to be supplied from a battery or the like. Accordingly, the conventional current control by the PWM duty signal using the switching element and the current circulating diode has the following problem. That is, even though the on-duty value is reduced to 0% to turn off the duty output in the case that the target current is rapidly reduced, falling of the drive current is limited by a time constant determined by the inductance component and the resistance component of the solenoid, causing a deterioration in response characteristic.

Further, the conventional current feedback control using the PID controller has the following problem. That is, rising of the actual current delays from the target current, causing a deterioration in response characteristic of the drive torque to result in defective behavior of the vehicle. Further, the brake (clutch) plates and the brake (clutch) discs configuring the wet multiplate brake (clutch) are deteriorated with secular change (wearing), and the initial gap between the core and the armature in the off state of the solenoid is accordingly reduced. Such a reduction in the initial gap causes an increase in the inductance component of the solenoid, thus degrading the response characteristic upon rising of the drive current.

SUMMARY OF THE INVENTION

It is therefore an object of the present invention to provide a solenoid driving device improved mainly in current falling characteristic.

It is another object of the present invention to provide an electromagnetic actuator control device which can improve a current rising characteristic in PWM duty driving of a solenoid.

In accordance with an aspect of the present invention, there is provided a device for driving a solenoid, including a power supply; a switching element connected between the power supply and the solenoid in series therewith; a current circulating diode connected in parallel to the solenoid so that the cathode of the current circulating diode is connected between the switching element and the solenoid; a current detecting circuit for detecting an actual current flowing through the solenoid; PID computing means for computing an on-duty value and an off-duty value according to a difference between a target current and the actual current detected by the current detecting circuit, and outputting the on-duty value and the off-duty value; PWM duty driving means for generating a PWM duty signal according to inputting of the on-duty value and supplying the PWM duty signal to the switching element to on/off control the switching element; and reverse voltage applying means capable of applying a voltage of the power supply as a reverse voltage to the solenoid according to inputting of the off-duty value when the switching element is off.

With this configuration, the solenoid driving device has the reverse voltage applying means capable of applying the power supply voltage as a reverse voltage to the solenoid according to inputting of the off-duty value when the switching element is off. Accordingly, falling of the drive current upon deenergization of the solenoid can be made as required without being limited by a time constant determined by the inductance component and the resistance component of the solenoid, thus improving the response characteristic of the solenoid.

Preferably, the reverse voltage applying means includes a second switching element connected between the negative electrode of the power supply and the solenoid in series therewith; a second current circulating diode connected in parallel to a series circuit composed of the switching element and the solenoid so that the cathode of the second current circulating diode is connected between the power supply and the switching element; and second PWM duty driving means for generating a second PWM duty signal according to inputting of the off-duty value and supplying the second PWM duty signal to the second switching element to on/off control the second switching element.

With this configuration, when both the switching element and the second switching element become off, the supply voltage can be applied as a reverse voltage to the solenoid through a loop of the second current circulating diode→the power supply→the current circulating diode. Furthermore, by PWM duty driving the second switching element, the reverse voltage of the power supply and about 0 V can be alternately applied to the solenoid.

By varying a PWM duty ratio for driving the second switching element, an average reverse voltage to be applied to the solenoid can be linearly varied, and the falling of the drive current upon switching off the switching element can be made steep as required without being limited by a time constant determined by the inductance component and the resistance component of the solenoid, thus improving the response characteristic of the solenoid.

Preferably, the reverse voltage applying means includes a second switching element connected between the negative electrode of the power supply and the solenoid in series therewith; a second current circulating diode connected in parallel to a series circuit composed of the switching element and the solenoid so that the cathode of the second current circulating diode is connected between the power supply and the switching element; absolute value calculating means for calculating the absolute values of the on-duty value and the off-duty value; an inverter for inverting the signs of the on-duty value and the off-duty value; a NAND circuit adapted to input an output from the absolute value calculating means and an output from the inverter; and a driver circuit for on/off controlling the second switching element according to an output from the NAND circuit.

With this configuration, the switching element and the second switching element can be driven by switching a single PWM duty signal without the use of the second PWM duty driving means. Accordingly, the solenoid driving device can be produced at a low cost.

Preferably, the PID computing means includes integral term calculating means for calculating an integral term according to the difference between the target current and the actual current; and means for resetting the integral term to 0 when the actual current becomes a predetermined value or less. Accordingly, by resetting the integral term of the PID computing means to 0 when the actual current becomes the predetermined value or less, it is possible to avoid the possibility that the integral term component may be kept at a negative value. As a result, delay from the instruction of the next rising of the drive current can be reduced to thereby improve the current rising characteristic.

Preferably, the power supply includes a single power supply. In the case of using a plurality of power supplies, it is relatively easy to make steep the current falling characteristic upon deenergization of the solenoid. According to the present invention, although the single power supply is used, the current falling characteristic upon deenergization of the solenoid can be made steep as required to thereby improve the response characteristic.

In accordance with another aspect of the present invention, there is provided a control device for an electromagnetic actuator including a core member having a groove, a solenoid accommodated in the groove of the core member, and an armature member opposed to the core member with a gap defined therebetween, the control device including gap detecting means for detecting the gap between the core member and the armature member; current detecting means for detecting an actual current flowing through the solenoid; a feedback controller for feedback controlling the actual current so that the actual current becomes equal to a target current; a feedforward controller for feedforward controlling the target current; and solenoid drive signal generating means for generating a solenoid drive signal according to outputs from the feedback controller and the feedforward controller; the feedback controller changing an integral term constant according to the gap detected by the gap detecting means.

With this configuration, the feedback controller changes the integral term constant according to the gap detected by the gap detecting means. Accordingly, the rising response characteristic of the actual current can be improved, and the convergence to a steady state can be quickly achieved by the feedback control.

Preferably, the feedforward controller changes a transfer function and/or a gain according to the gap detected by the gap detecting means. With this configuration, the transfer function and/or the gain of the feedforward controller are/is changed according to the gap detected. Accordingly, a suitable overshoot can be generated upon rising of the actual current, and the rising response characteristic of the actual current can be improved according to the gap detected. As a result, the rising response characteristic of the actual current can be improved more finely.

Preferably, the feedback controller selects a larger one of the integral term constants when the gap is large, and selects a smaller one of the integral term constants when the gap becomes smaller. With this configuration, a smaller one of the integral term constants is selected as the gap decreases. Accordingly, the rising response characteristic of the actual current can be improved, and the convergence to a steady state can be quickly achieved by the feedback control.

In accordance with a further aspect of the present invention, there is provided a control device for an electromagnetic actuator including a core member having a groove, a solenoid accommodated in the groove of the core member, and an armature member opposed to the core member with a gap defined therebetween, the control device including gap detecting means for detecting the gap between the core member and the armature member; current detecting means for detecting an actual current flowing through the solenoid; a feedback controller for feedback controlling the actual current so that the actual current becomes equal to a target current; a feedforward controller for feedforward controlling the target current; and solenoid drive signal generating means for generating a solenoid drive signal according to outputs from the feedback controller and the feedforward controller; the feedforward controller changing a transfer function and/or a gain according to the gap detected by the gap detecting means.

With this configuration, the transfer function and/or the gain of the feedforward controller are/is changed according to the gap detected. Accordingly, a suitable overshoot can be generated upon rising of the actual current, and the rising response characteristic of the actual current can be improved.

Preferably, the feedforward controller selects a smaller one of the transfer functions and/or a smaller one of the gains when the gap is large, and selects a larger one of the transfer functions and/or a larger one of the gains when the gap becomes smaller.

The inductance component of the solenoid is small when the gap is large, and increases with a decrease in the gap. Accordingly, the rising response characteristic of the actual current is degraded with a decrease in the gap. To cope with this problem, a larger one of the transfer functions and/or a larger one of the gains is selected when the gap becomes smaller, thereby feedforward controlling the target current. As a result, a suitable overshoot can be generated upon rising of the actual current irrespective of the magnitude of the gap, thus improving the rising response characteristic of the actual current.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 4 is a circuit diagram showing the operation of the present invention when a first FET and a second FET are both on;

FIG. 5 is a circuit diagram showing the operation of the present invention when the first FET is off and the second FET is on;

DETAILED DESCRIPTION OF THE PREFERRED EMBODIMENTS

Figure 1:
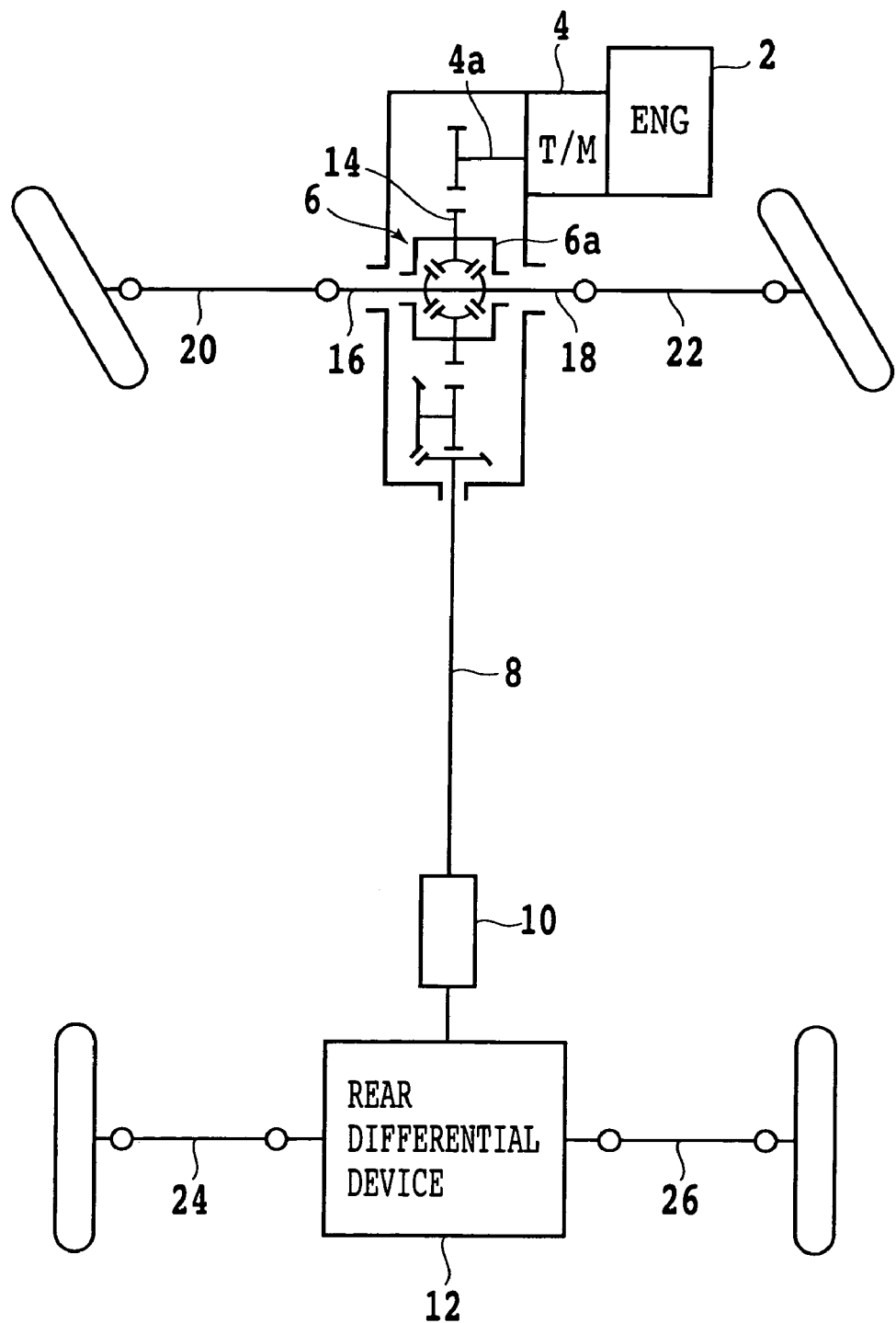
FIG. 1 is a schematic plan view showing a power transmitting system in a four-wheel drive vehicle.

Referring to FIG. 1, there is shown a schematic plan view of a power transmitting system in a four-wheel drive vehicle based on a front-engine front-drive (FF) vehicle to which the solenoid driving device of the present invention is applicable. As shown in FIG. 1, the power transmitting system mainly includes a front differential device 6 to which power output from an engine 2 located at a front portion of the vehicle is transmitted through an output shaft 4a of a transmission 4, a speed increasing device (speed changing device) 10 to which power output from the front differential device 6 is transmitted through a propeller shaft 8, and a rear differential device 12 to which power output from the speed increasing device 10 is transmitted.

The front differential device 6 has a structure well known in the art. That is, the power from the output shaft 4a of the transmission 4 is transmitted through a plurality of gears 14 and output shafts 16 and 18 provided in a differential case 6a to left and right front axles 20 and 22, thereby driving left and right front wheels. As will be hereinafter described in detail, the rear differential device 12 includes a pair of planetary gear sets and a pair of electromagnetic actuators each for controlling the operation of a multiplate brake mechanism. The electromagnetic actuators are controlled to transmit the power to left and right rear axles 24 and 26, thereby driving left and right rear wheels.

Figure 2:
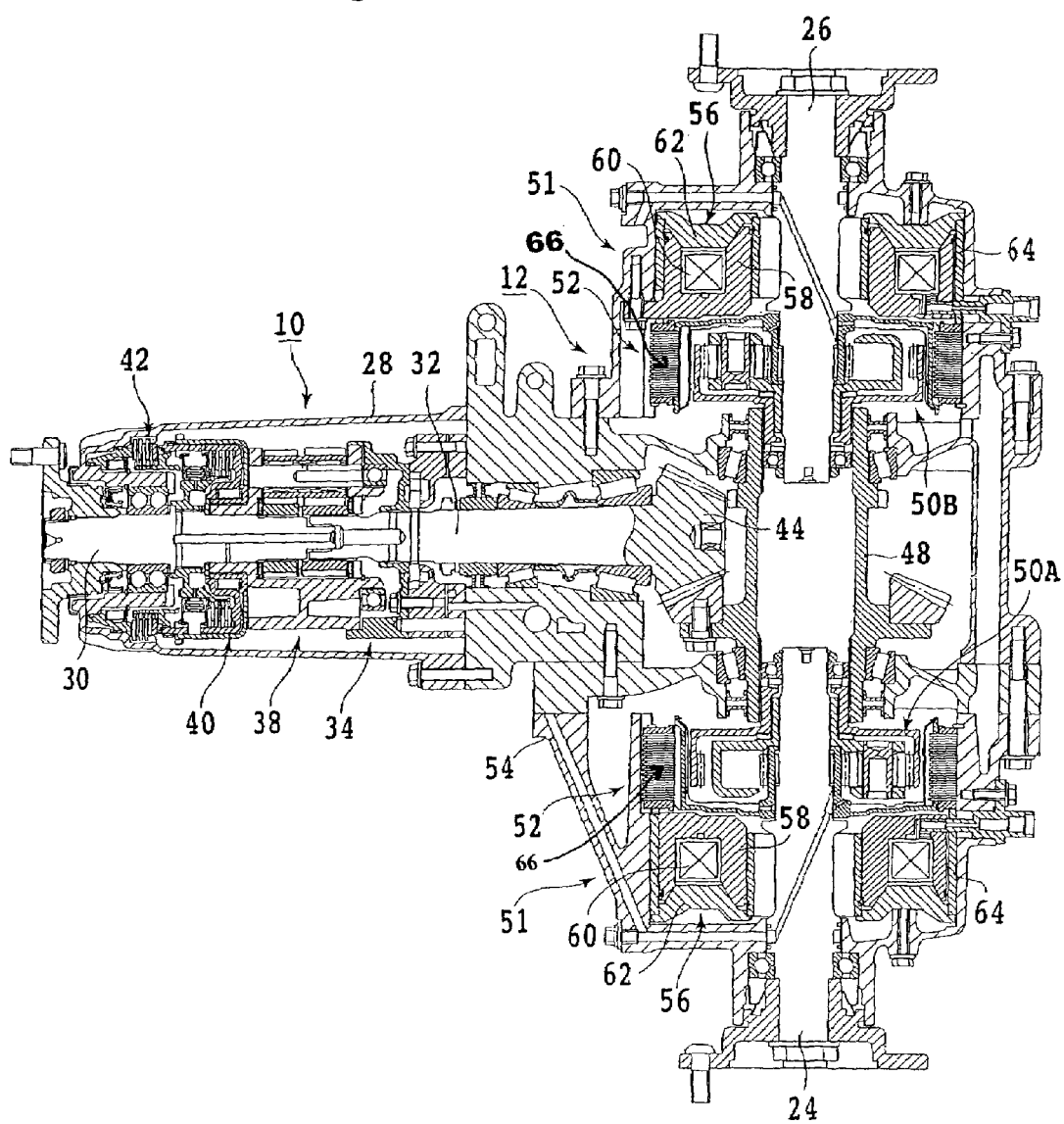
FIG. 2 is a sectional view of a speed increasing device (speed changing device) and a rear differential device.

FIG. 2 is a sectional view of the speed increasing device (speed changing device) 10 and the rear differential device 12 located downstream of the speed increasing device 10 with respect to the flow of power transmission. The speed increasing device 10 includes an input shaft 30 rotatably mounted in a casing 28, and an output shaft (hypoid pinion shaft) 32. The speed increasing device 10 further includes an oil pump subassembly 34, a planetary carrier subassembly 38, a direct drive clutch subassembly 40, and a speed changing brake 42.

The rear differential device 12 located downstream of the speed increasing device 10 has a hypoid pinion gear 44 formed at the rear end of the hypoid pinion shaft 32. The hypoid pinion gear 44 is in mesh with a hypoid ring gear 48. Power from the hypoid ring gear 48 is input to ring gears in a pair of left and right planetary gear sets 50A and 50B. Sun gears in the planetary gear sets 50A and 50B are rotatably mounted on the left and right rear axles 24 and 26, respectively.

Planetary carriers in the planetary gear sets 50A and 50B are fixed to the left and right rear axles 24 and 26, respectively. In each of the planetary gear sets 50A and 50B, a planet gear carried by the planetary carrier is in mesh with the sun gear and the ring gear. Each of the planetary gear sets 50A and 50B is connected to a brake mechanism 51 provided to variably control the torque of the sun gear. The brake mechanism 51 includes a wet multiplate brake 52 and an electromagnetic actuator 56 for operating the multiplate brake 52. The multiplate brake 52 has a plurality of brake plates fixed to a casing 54 and a plurality of brake discs fixed to the sun gear in each of the planetary gear sets 50A and 50B.

The electromagnetic actuator 56 includes a ring like core (yoke) 58 having an annular groove, an annular solenoid 60 inserted in the annular groove of the ringlike core 58, a ringlike armature 62 opposed to the ringlike core 58 with a given gap defined therebetween, and an annular piston 64 integrally connected to the armature 62. When a current is supplied to the solenoid 60 to energize the solenoid 60, the armature 62 is attracted to the core 58 by the solenoid 60 to generate a thrust. As a result, the piston 64 integrally connected to the armature 62 is operated to engage the multiplate brake 52, thereby generating a brake torque.

Accordingly, the sun gears in the planetary gear sets 50A and 50B are fixed to the respective casings 54, and the drive force of the hypoid pinion shaft 32 is transmitted through the ring gears, the planet gears, and the planet carriers in the planetary gear sets 50A and 50B to the left and right rear axles 24 and 26. By controlling the currents passing through the solenoids 60, the drive force of the input shaft 30 can be arbitrarily distributed to the left and right rear axles 24 and 26 directly or after increasing the speed through the speed increasing device 10, thus realizing optimum turning control.

A search coil 66 is mounted adjacent to each solenoid 60. The search coil 66 is provided to detect a magnetic flux intensity in passing the current through each solenoid 60. The gap between the core 58 and the armature 62 is estimated according to the magnetic flux intensity detected by the search coil 66, and each solenoid 60 is feedback- and feedforward-controlled according to the gap estimated above.

Figure 3:
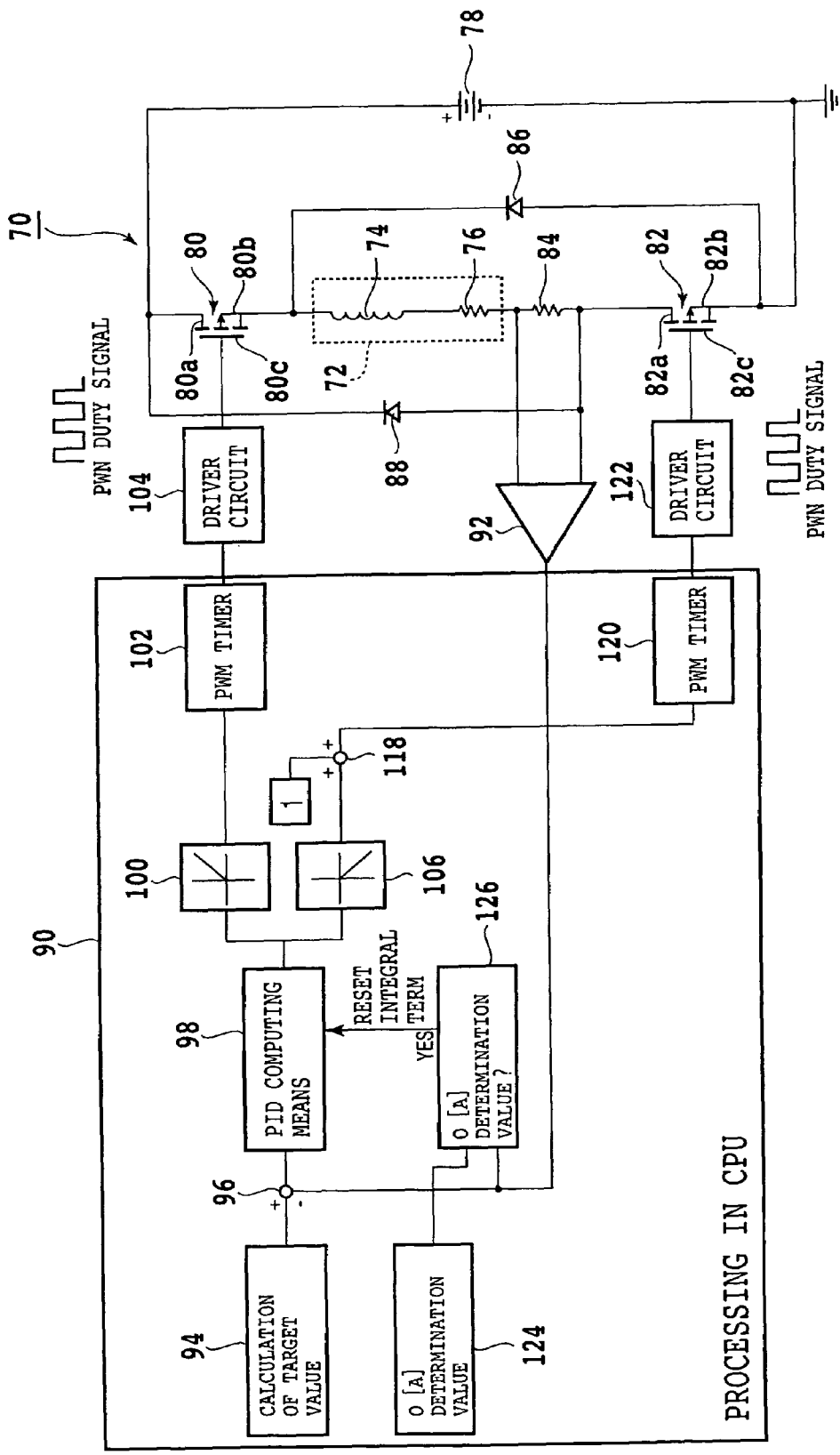
FIG. 3 is a circuit diagram of a solenoid driving device according to a first preferred embodiment of the present invention.

Referring to FIG. 3, there is shown a solenoid driving circuit 70 according to a first preferred embodiment of the present invention. Reference numeral 72 denotes a solenoid. For example, the solenoid 72 corresponds to each annular solenoid 60 shown in FIG. 2, and has an inductance component 74 and a resistance component 76. Reference numeral 78 denotes a power supply such as a battery. For example, the power supply voltage is about 12 V. The negative electrode of the power supply 78 is grounded. A first FET (switching element) 80 is connected between the positive electrode of the power supply 78 and the solenoid 72 in series therewith. In other words, a drain 80a of the first FET 80 is connected to the power supply 78, and a source 80b of the first FET 80 is connected to the solenoid 72.

A second FET (switching element) 82 is connected between the negative electrode of the power supply 78 and the solenoid 72 in series therewith. In other words, a source 82b of the second FET 82 is grounded, and a drain 82a of the second FET 82 is connected to the solenoid 72. A resistor 84 for detecting a current is connected between the solenoid 72 and the second FET 82 in series therewith. Further, a first diode 86 for circulating a current is connected in parallel to a series circuit consisting of the solenoid 72, the resistor 84, and the second FET 82 in such a manner that the cathode of the first diode 86 is connected between the solenoid 72 and the first FET 80. On the other hand, a second diode 88 for circulating a current is connected in parallel to a series circuit consisting of the solenoid 72 and the resistor 84 in such a manner that the cathode of the second diode 88 is connected between the positive electrode of the power supply 78 and the first FET 80.

A block 90 denotes processing in a CPU of an ECU mounted on the vehicle. The current passing through the solenoid 72 is detected as a potential difference between the opposite ends of the resistor 84, and this detected potential difference is amplified by a current detecting circuit 92 and next fed back. A target current is calculated by a block 94, and a difference between the target current and the current (actual current) detected by the current detecting circuit 92 is calculated by a subtractor 96. This difference is input into PID computing means 98. The PID computing means 98 computes a proportional term (P term), an integral term (I term), and a derivative term or differential term (D term) according to the input difference, and outputs a positive on-duty value and a negative off-duty value.

The positive on-duty value is selected by an on-duty value selecting circuit 100 and next input into a pulse width modulation (PWM) timer 102. The PWM timer 102 outputs a rectangular pulse width modulation (PWM) duty signal as a binary signal composed of "1" and "0". This PWM duty signal is amplified by a driver circuit 104 and next supplied to a gate 80c of the first FET 80, thereby switching on and off the first FET 80 according to the PWM duty signal from the driver circuit 104. The voltage applied from the driver circuit 104 to the gate 80c of the first FET 80 is about 24 V, for example.

On the other hand, the negative off-duty value output from the PID computing means 98 is selected by an off-duty value selecting circuit 106, and a value of +1 is added to this off-duty value by an adder 118. An output from the adder 118 is input into a PWM timer 120. The PWM timer 120 also outputs a rectangular PWM duty signal as a binary signal composed of "1" and "0". This PWM duty signal is amplified by a driver circuit 122 and next supplied to a gate 82c of the second FET 82, thereby switching on and off the second FET 82 according to the PWM duty signal from the driver circuit 122. The voltage applied from the driver circuit 122 to the gate 82c of the second FET 82 is about 12 V, for example.

The current detected by the current detecting circuit 92 and a 0-ampere determination value set in a block 124 are input into a 0-ampere determining circuit 126 to determine whether or not the detected current (actual current) has become equivalent to 0 ampere. When it is determined that the detected current has become the 0-ampere determination value or less, the integral term computed by the PID computing means 98 is reset to 0. In the solenoid driving circuit 70 according to this preferred embodiment, the first FET 80 is normally off, and the second FET 82 is normally on because the PWM duty signal is normally supplied to the gate 82c.

The operation of the solenoid driving circuit 70 according to the first preferred embodiment will now be described with reference to FIGS. 4 to 6. In the case that both the first FET 80 and the second FET 82 are on as shown in FIG. 4, the supply voltage Vbat [V] is applied to the opposite ends of the solenoid 72, so that a forward current by the power supply 78 flows through the solenoid 72 as shown by a loop 130.

Figure 5:
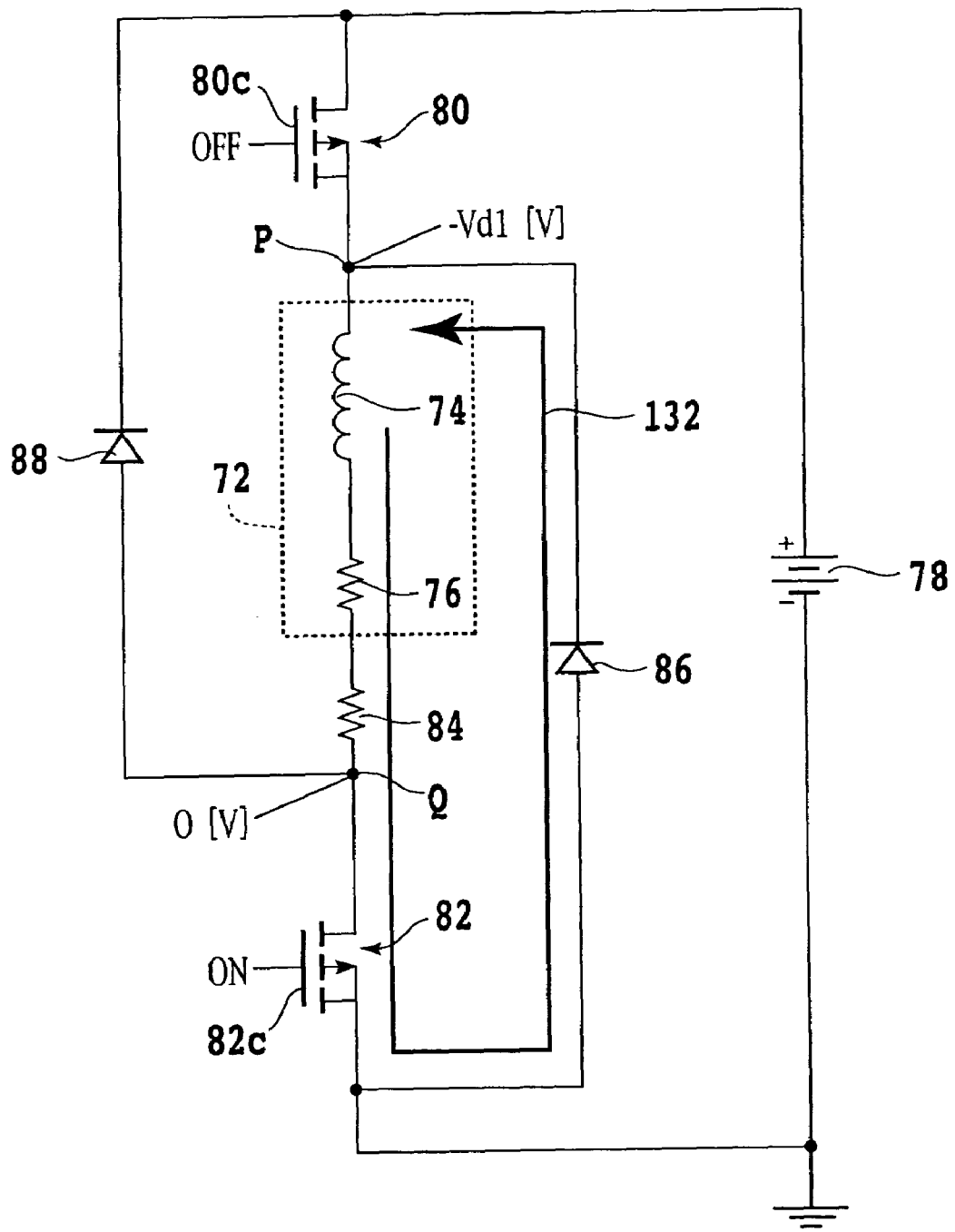
Figure 6:
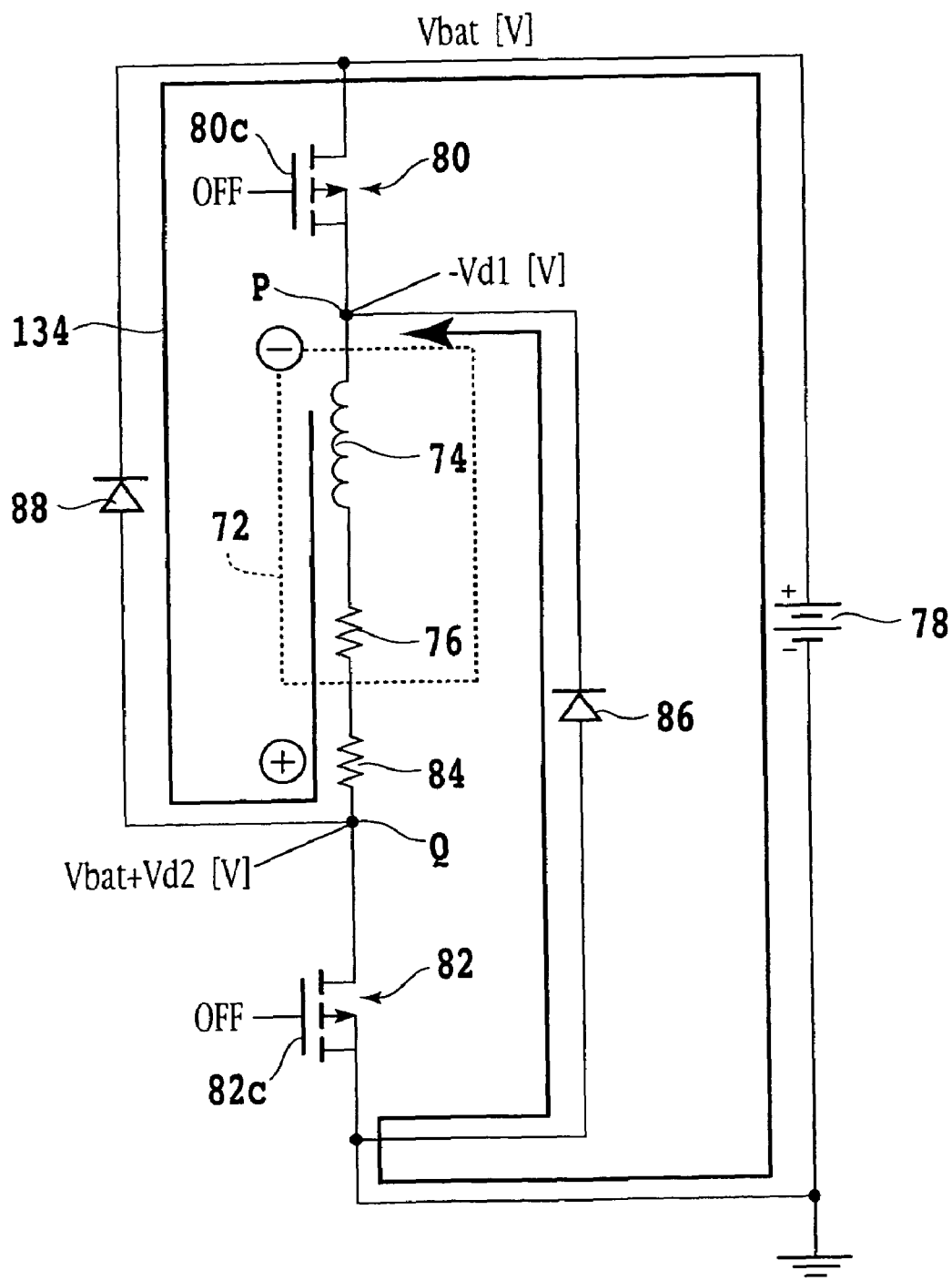
FIG. 6 is a circuit diagram showing the operation of the present invention when the first FET and the second FET are both off.

When the first FET 80 becomes off in the condition where the second FET 82 remains on as shown in FIG. 5, the potential at a point P lowers by a forward voltage across the first diode 86 to become −Vd1 [V]. The potential at a point Q is a grounded potential, or 0 [V] because the second FET 82 is on. Accordingly, a voltage of about −Vd1 [V] is applied to the opposite ends of the solenoid 72. Since the first diode 86 is connected in parallel to the solenoid 72, a circulating current flows as shown by a loop 132.

Figure 4:
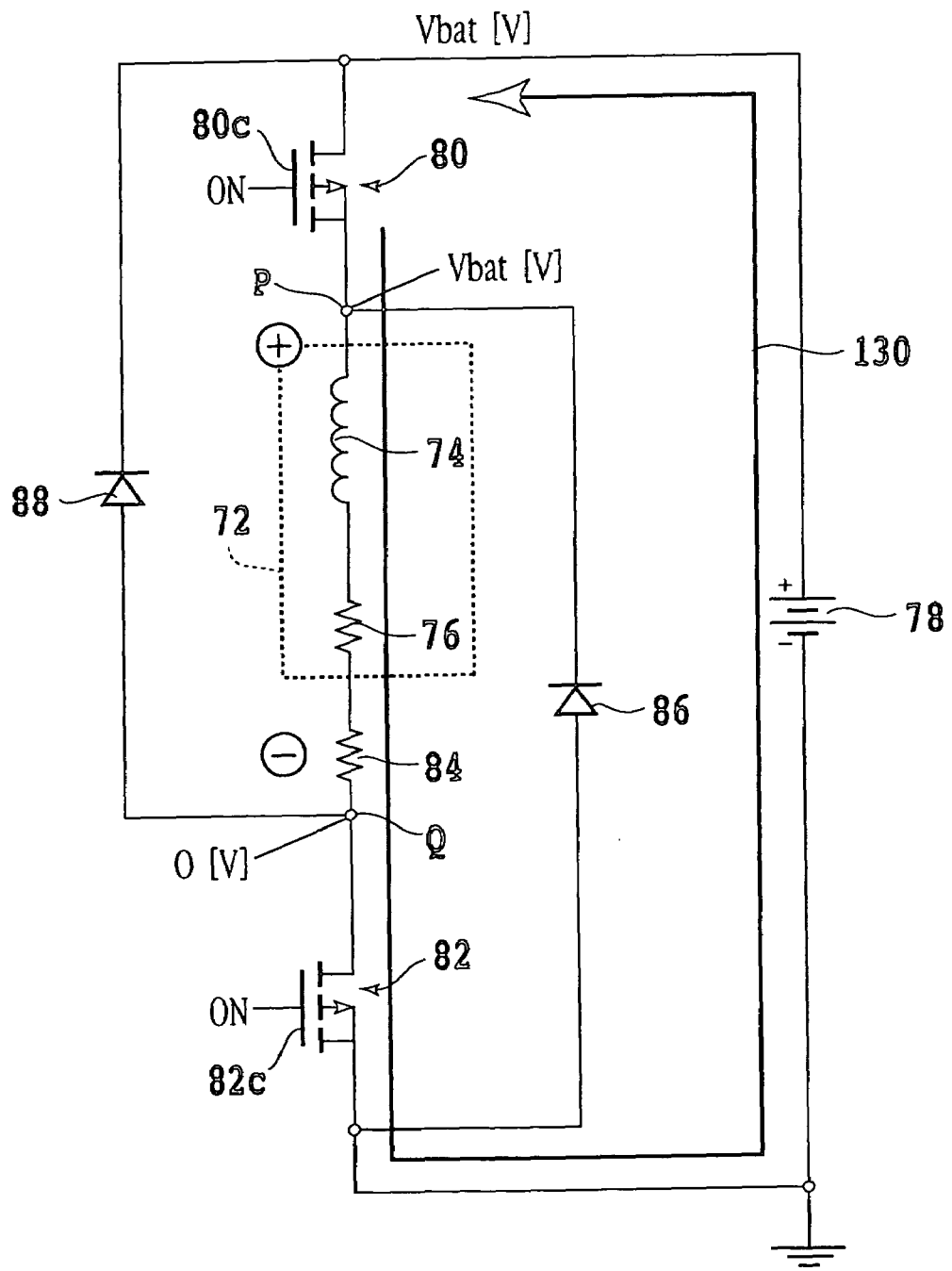

In normally driving the solenoid 72, the first FET 80 is switched on and off in the condition where the second FET 82 is kept on as shown in FIGS. 4 and 5. Accordingly, a drive current can be passed through the solenoid 72 according to the duty ratio of the PWM duty signal output from the PWM timer 102. When the current passing through the solenoid 72 is rapidly reduced, both the first FET 80 and the second FET 82 become off as shown in FIG. 6. Accordingly, the potential at the point P lowers by a forward voltage across the first diode 86 to become −Vd1 [V], and the potential at the point Q becomes Vbat+Vd2 [V].

Since the forward voltage across each of the first and second diodes 86 and 88 is much lower than the supply voltage, the voltage of the power supply 78 is applied as a reverse voltage to the opposite ends of the solenoid 72. The first and second diodes 86 and 88 are connected in series with the solenoid 72, so that a circulating current as shown by a loop 134 flows through the solenoid 72. By driving the second FET 82 according to the PWM duty signal in the condition where the first FET 80 is off, 0 V and the reverse voltage of the power supply 78 can be alternately applied to the solenoid 72 as shown in FIGS. 5 and 6.

By changing the duty ratio of the PWM duty signal to be supplied to the gate 82c of the second FET 82, an average reverse voltage to be applied to the solenoid 72 can be linearly controlled, and the falling of the drive current can be made steep as required without being limited by a time constant determined by the inductance component 74 and the resistance component 76 of the solenoid 72, thus improving the response characteristic of the solenoid 72.

Figure 7:
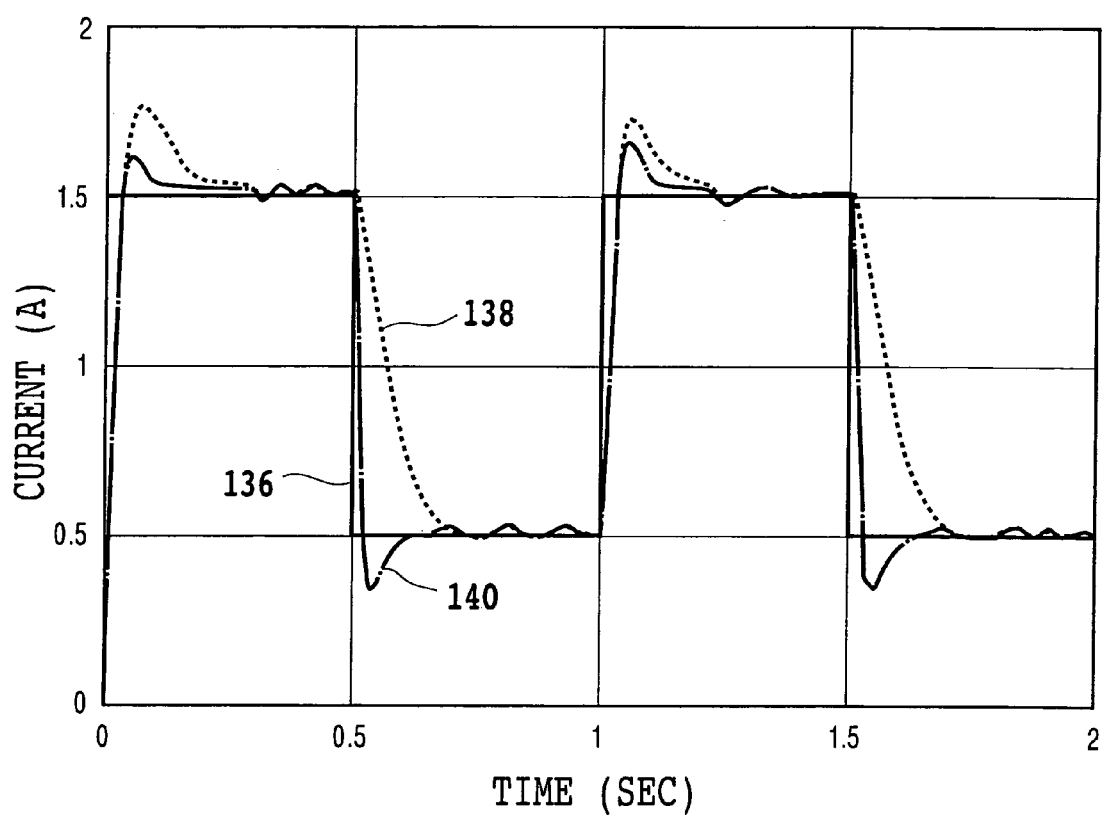
FIG. 7 is a computer simulation showing drive waveforms in the prior art and according to the present invention.

FIG. 7 is a computer simulation showing the comparison of a drive waveform according to the present invention and a drive waveform in the prior art in the case of rectangular wave drive. These waveforms are those offset by +0.5 V to show the undershoot in the present invention upon falling of the drive current. Rectangular wave 136 denotes a target current, and waveforms 138 and 140 denote a driving method in the prior art and a driving method according to the present invention, respectively. As apparent from FIG. 7, the falling of the drive current by the driving method 140 according to the present invention can be made steeper than that by the driving method 138 in the prior art. Thus, the response characteristic can be improved according to the present invention.

Figure 8:
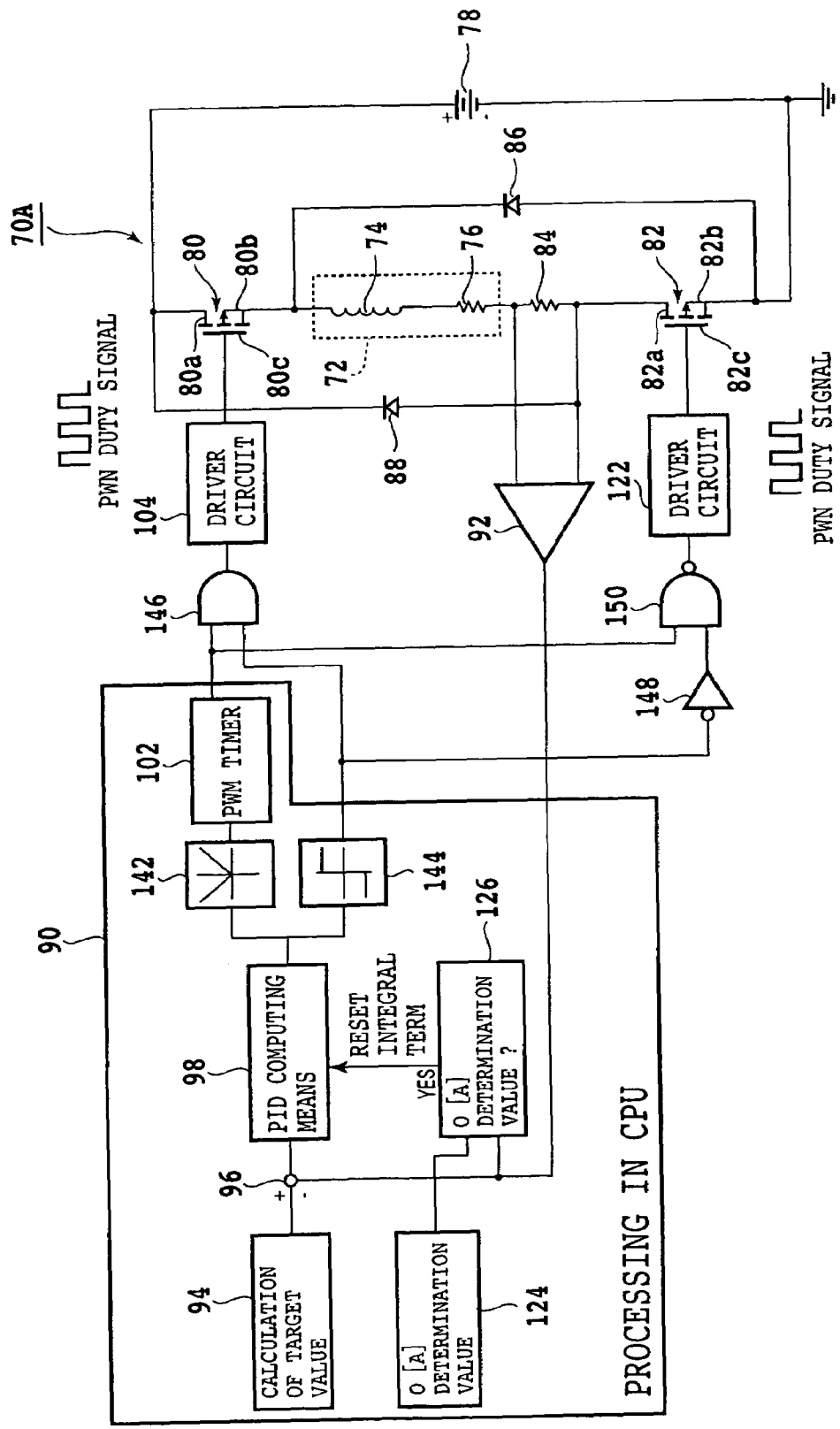
FIG. 8 is a circuit diagram of a solenoid driving device according to a second preferred embodiment of the present invention.

FIG. 8 shows a solenoid driving circuit 70A according to a second preferred embodiment of the present invention. Substantially the same parts as those of the first preferred embodiment mentioned above are denoted by the same reference numerals, and the description thereof will be omitted herein. The first preferred embodiment mentioned above employs the two PWM timers 102 and 120, so that the solenoid driving circuit 70 may be expensive to some extent. In contrast thereto, the second preferred embodiment shown in FIG. 8 employs only one PWM timer and additionally uses logic circuits, whereby a single PWM duty signal is switched to drive the first and second FETs 80 and 82 according to the PWM duty signal.

A positive on-duty value and a negative off-duty value are output from PID computing means 98. Absolute values for the on-duty value and the off-duty value are calculated by an absolute value calculating circuit 142, and next input into a PWM timer 102. Further, the signs of the on-duty value and the off-duty value are determined by a sign determining circuit 144. The sign determining circuit 144 outputs "1" in the case of the positive on-duty value (inclusive of 0) or "0" in the case of the negative off-duty value.

The PWM duty signal output from the PWM timer 102 and the output from the sign determining circuit 144 are input into an AND circuit 146. The AND circuit 146 outputs only the PWM duty signal based on the on-duty value. This PWM duty signal is amplified by a driver circuit 104 and next supplied to the gate 80c of the first FET 80, thus on/off controlling the first FET 80.

The PWM duty signal output from the PWM timer 102 is supplied also to a NAND circuit 150. The output from the sign determining circuit 144 is supplied to an inverter 148 to obtain an inverted signal, and this inverted signal is input into the NAND circuit 150. Accordingly, the NAND circuit 150 outputs only the PWM duty signal based on the negative off-duty value output from the PID computing means 98.

The PWM duty signal output from the NAND circuit 150 is amplified by a driver circuit 122 and next supplied to the gate 82c of the second FET 82, thus on/off controlling the second FET 82. More specifically, in the case that the on-duty value is output from the PID computing means 98, the second FET 82 becomes a full-on condition, and with an increase in output of the off-duty value, the off-time of the second FET 82 increases. The operation of this preferred embodiment is similar to that of the first preferred embodiment mentioned above with reference to FIGS. 4 to 6, so the description thereof will be omitted herein.

Figure 9:
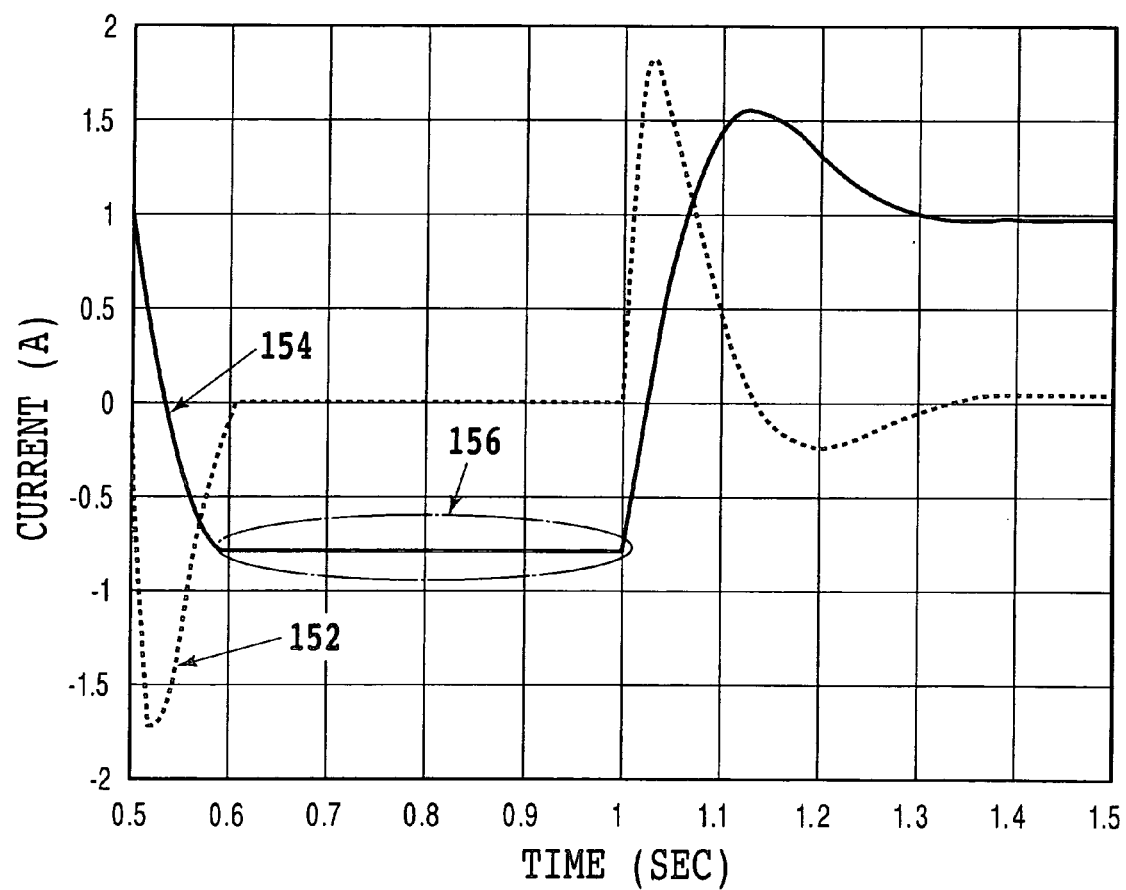
FIG. 9 is a graph (computer simulation) showing changes in integral term component and in proportional term component in the case that the integral term is not reset to 0.

According to the present invention, a negative on-duty value is output from the PID computing means 98 when the target current is reduced. In this case, there is a possibility that the output from the PID computing means 98 remains a negative value when the actual current becomes 0 ampere, causing a degradation in response characteristic of the next rising of the drive current. That is, as shown in FIG. 9, when the actual current becomes 0 ampere with the target current reduced to 0 ampere, the integral term (I term) component of the PID computing means 98 is kept at a negative value as shown by reference numeral 156. In FIG. 9, the proportional term component of the PID computing means 98 is shown by a curve 152, and the integral term component is shown by a curve 154.

Figure 10:
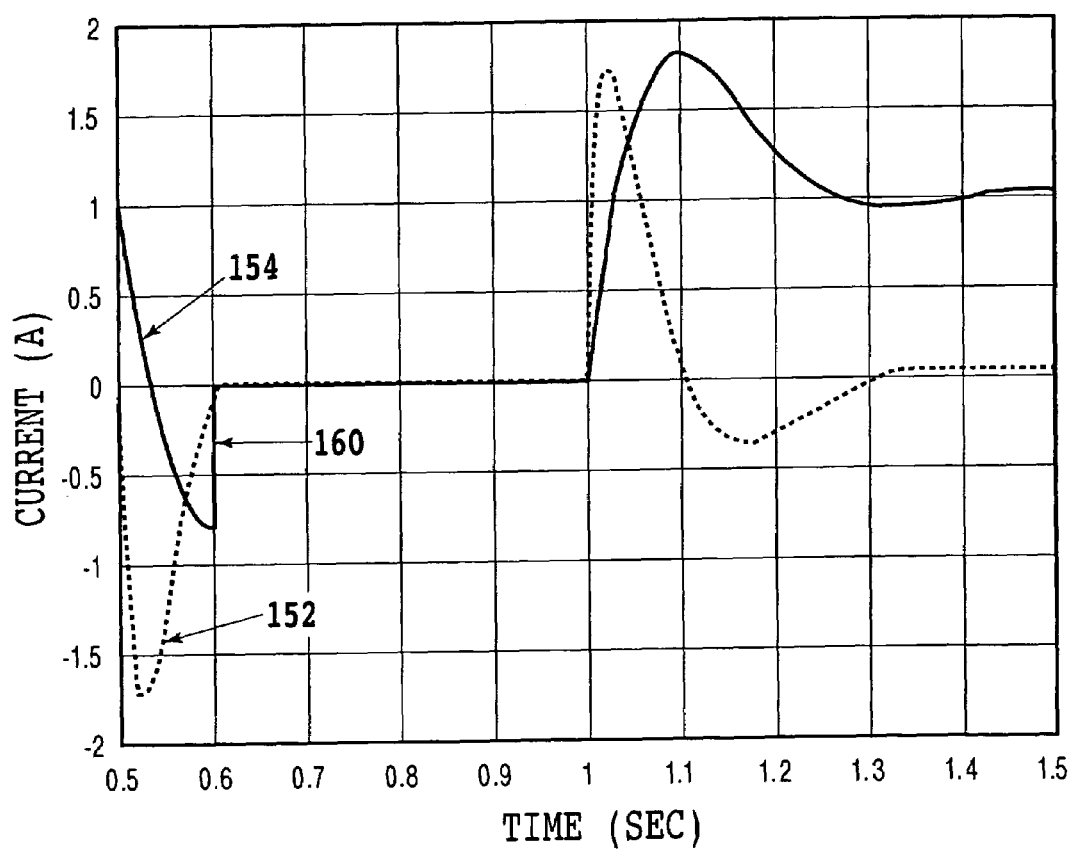
FIG. 10 is a graph (computer simulation) showing changes in integral term component and in proportional term component in the case that the integral term is reset to 0.
Figure 11:
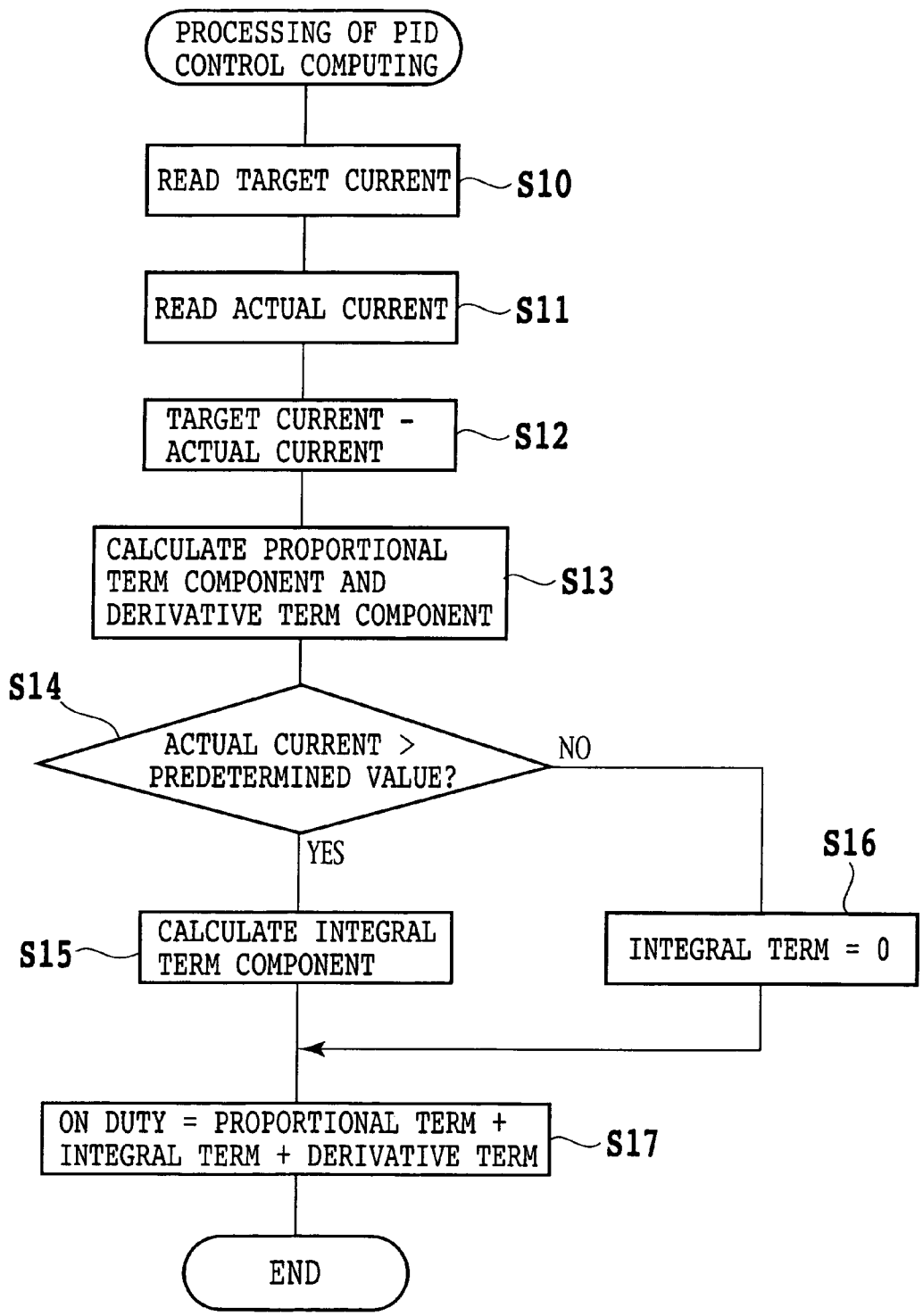
FIG. 11 is a flowchart showing a program for resetting the integral term to 0.

This possibility that the integral term component 154 of the PID computing means 98 may be kept at a negative value can be avoided by resetting the integral term component to 0 as shown by reference numeral 160 in FIG. 10 when the actual current becomes a predetermined value (e.g., 0.01 ampere) or less. By this method, delay from the instruction of the next rising of the drive current can be reduced. This resetting method for the integral term will now be described with reference to a flowchart shown in FIG. 11.

In step S10, a target current is read. In step S11, an actual current (detected current) is read. In step S12, a difference between the target current and the actual current is calculated, and a proportional term component and a derivative term component are calculated according to this difference (step S13). The program next proceeds to step S14 to determine whether or not the actual current is greater than a predetermined value (e.g., 0.01 ampere). If the actual current is greater than the predetermined value, the program proceeds to step S15 to calculate an integral term component according to the difference between the target current and the actual current, whereas if the actual current is not greater than the predetermined value, the program proceeds to step S16 to reset the integral term to 0. The program next proceeds to step S17 to calculate a duty value composed of the proportional term, the integral term, and the derivative term.

Figure 12:
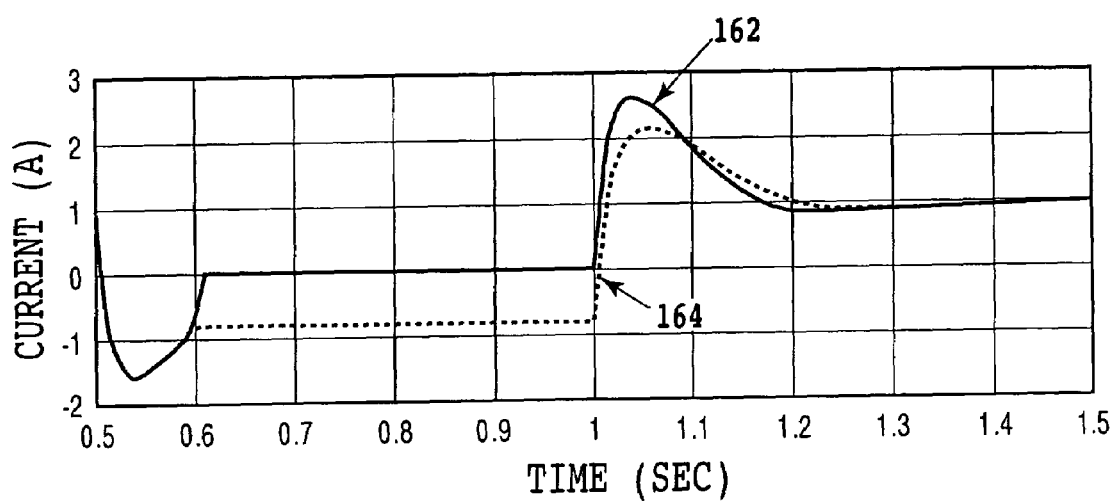
FIG. 12 is a graph (computer simulation) showing changes in actual current in the case that the integral term is reset to 0 and in the case that the integral term is not reset to 0.

FIG. 12 shows changes in the actual current in the case that the integral term is reset to 0 and in the case that the integral term is not reset to 0. More specifically, the actual current in the former case is shown by a curve 162, and the actual current in the latter case is shown by a curve 164. As apparent from FIG. 12, delay from the instruction of the next rising of the drive current can be reduced by resetting the integral term to 0 when the actual current becomes a predetermined or less.

While the solenoid driving device of the present invention described above is applicable to driving of a general solenoid, the effect of the present invention is especially large when this device is applied to the case where a single power supply such as a battery can only be used as in an electromagnetic actuator driving device mounted on an automobile, for example.

Figure 13:
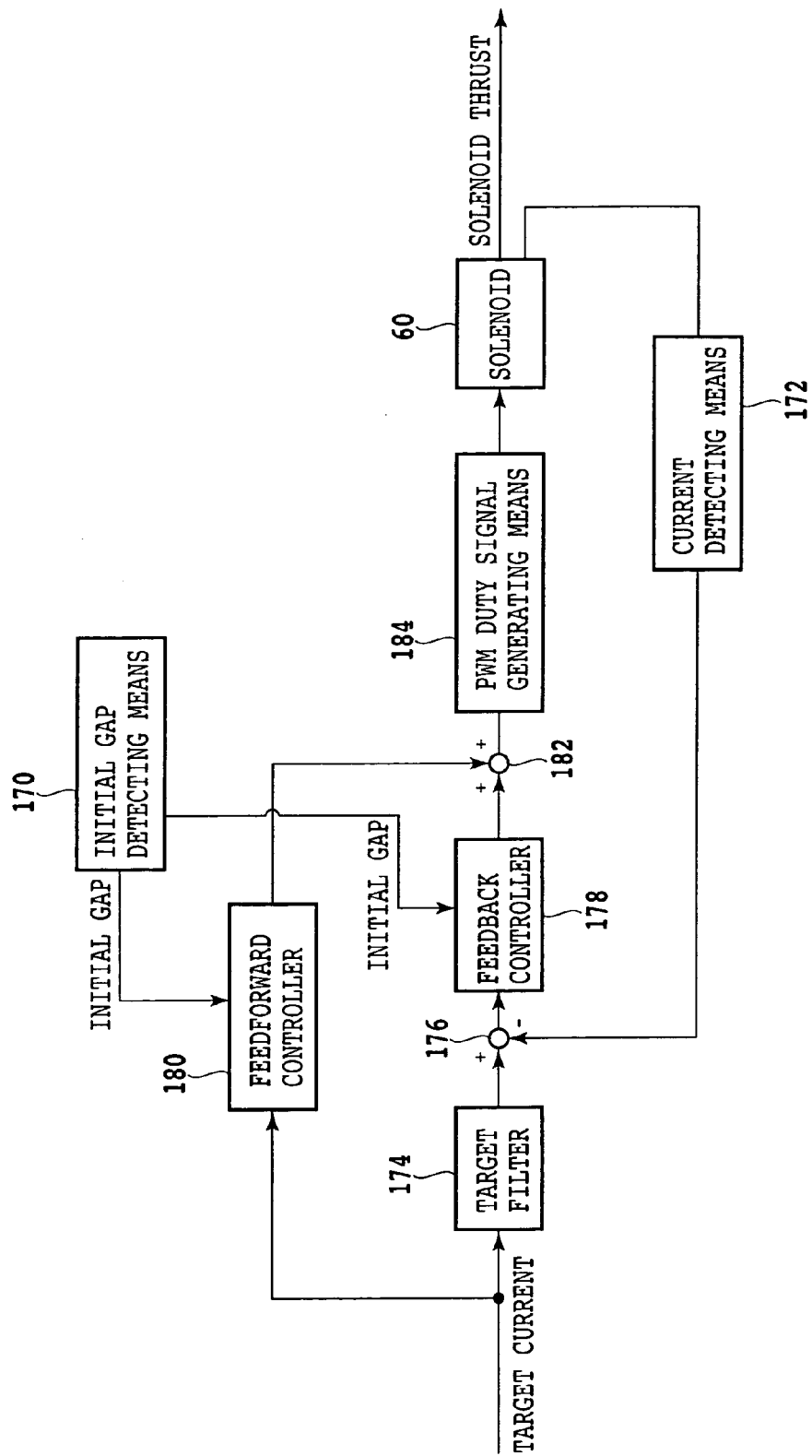
FIG. 13 is a block diagram showing the principle of the electromagnetic actuator control device according to the present invention.

Referring to FIG. 13, there is shown a block diagram of the principle of the electromagnetic actuator control device according to the present invention. The electromagnetic actuator includes a core member having a groove, a solenoid 60 accommodated in the groove of the core member, and an armature member opposed to the core member with a gap defined therebetween. The control device for the electromagnetic actuator is configured by a feedforward type control system with two degrees of freedom, and includes initial gap detecting means 170 for detecting an initial gap between the core member and the armature member at starting the operation of the solenoid 60.

The initial gap detecting means 170 detects the gap when the operation of the solenoid 60 is stopped or started or the average of these gaps as the initial gap. An actual current flowing through the solenoid 60 is detected by current detecting means 172. A target current (command current) is input through a target filter 174 to a subtractor 176. The target filter 174 is a temporary filter obtained by dividing the actual current by the target current. The response characteristic of the control device as a whole is determined by the characteristics of the target filter.

The actual current detected by the current detecting means 172 is subtracted from the target current passed through the target filter 174 by the subtractor 176, and the difference obtained by the subtractor 176 is input into a PID controller (feedback controller) 178. The PID controller 178 performs feedback control of the actual current so that the actual current becomes equal to the target current. The PID controller 178 changes the integral term constant according to the initial gap detected by the initial gap detecting means 170. For example, the PID controller 178 selects one of a plurality of predetermined integral term constants according to the detected initial gap.

A feedforward controller 180 performs feedforward control of the target current. More specifically, the feedforward controller 180 changes the transfer function and the gain according to the initial gap detected by the initial gap detecting means 170, thereby feedforward controlling the target current. For example, the feedforward controller 180 selects one of a plurality of predetermined transfer functions and one of a plurality of predetermined gains according to the detected initial gap. An output from the PID controller 178 and an output from the feedforward controller 180 are added by an adder 182, and the sum obtained by the adder 182 is input into pulse width modulation (PWM) duty signal generating means (solenoid drive signal generating means) 184.

The PWM duty signal generating means 184 generates a PWM duty signal (solenoid drive signal) according to the sum of the outputs from the PID controller 178 and the feedforward controller 180, and drives the solenoid 60 according to this PWM duty signal. When an actual current is passed through the solenoid 60, the armature 62 of the electromagnetic actuator 56 shown in FIG. 2 is attracted to the core 58 by the solenoid 60, thereby generating a thrust. As a result, the piston 64 integrally connected with the armature 62 is operated to engage the multiplate brake (clutch) 52, thus generating a brake (clutch) torque.

A specific configuration of the PID controller 178 shown in FIG. 13 will now be described with reference to FIG. 14. The PID controller 178 has a proportional term constant 186, five integral term constants 188#1 to 188#5, and a derivative term constant 200. The value of the proportional term constant 186 is 2, for example. The values of the integral term constants 188#1, 188#2, 188#3, 188#4, and 188#5 are 0.6, 0.6, 0.5, 0.33, and 0.33, respectively, for example. The integral term constant 188#1 is applied when the initial gap is large, and the integral term constants 188#2 to 188#5 are selectively applied in this order with a decrease in the initial gap. The values of the five integral term constants 188#1 to 188#5 may be set to different values. While the PID controller 178 has the derivative term constant 200, derivative term control is not actually performed because the value of the derivative term constant 200 is 0 in this preferred embodiment.

The magnetic flux intensity detected by the search coil 66 is converted into an initial gap by a map 190 for providing the correspondence between a magnetic flux intensity and an initial gap. Then, a suitable one of the integral term constants 188#1 to 188#5 is selected according to this initial gap by a multipoint switch 192. The target current is input through the target filter 174 to the subtractor 176. The actual current is subtracted from the target current by the subtractor 176, and the difference obtained by the subtractor 176 is input into the PID controller 178.

In computing the proportional term in the PID controller 178, the output from the subtractor 176 is multiplied by the value 2 of the proportional term constant 186, and the resultant produce is input into an adder 206. In computing the integral term in the PID controller 178, the output from the subtractor 176 is multiplied by the value 0.6 of the integral term constant 188#1, for example, selected according to the initial gap, and the resultant product is input into an adder 194. The present value output from the multipoint switch 192 and a previous value 198 are added by the adder 194, and the resultant sum is input through a limiter 196 into the adder 206.

In computing the derivative term in the PID controller 178, the output from the subtractor 176 is multiplied by the value 0 of the derivative term constant 200, and a previous value 204 is subtracted from the resultant product (the present value) by a subtractor 202. The resultant difference obtained by the subtractor 202 is input into the adder 206. In this preferred embodiment, the value of the derivative term constant 200 is 0 as mentioned above, this computing for the derivative term is not carried out. The values obtained by the above computation for the proportional term, the integral term, and the derivative term are added by the adder 206, and the resultant sum is output through a limiter 208.

In the PID controller 178 according to this preferred embodiment, a large value for the integral term constant is set when the initial gap is large, and smaller values for the integral term constant are stepwise set with a decrease in the initial gap. These set values are based on learning values preliminarily obtained by an experiment. Thus, an optimum integral term constant is selected according to the detected initial gap, so that the rising response characteristic of the actual current in PWM driving can be improved and the convergence to the target current can be quickly achieved.

Figure 15:
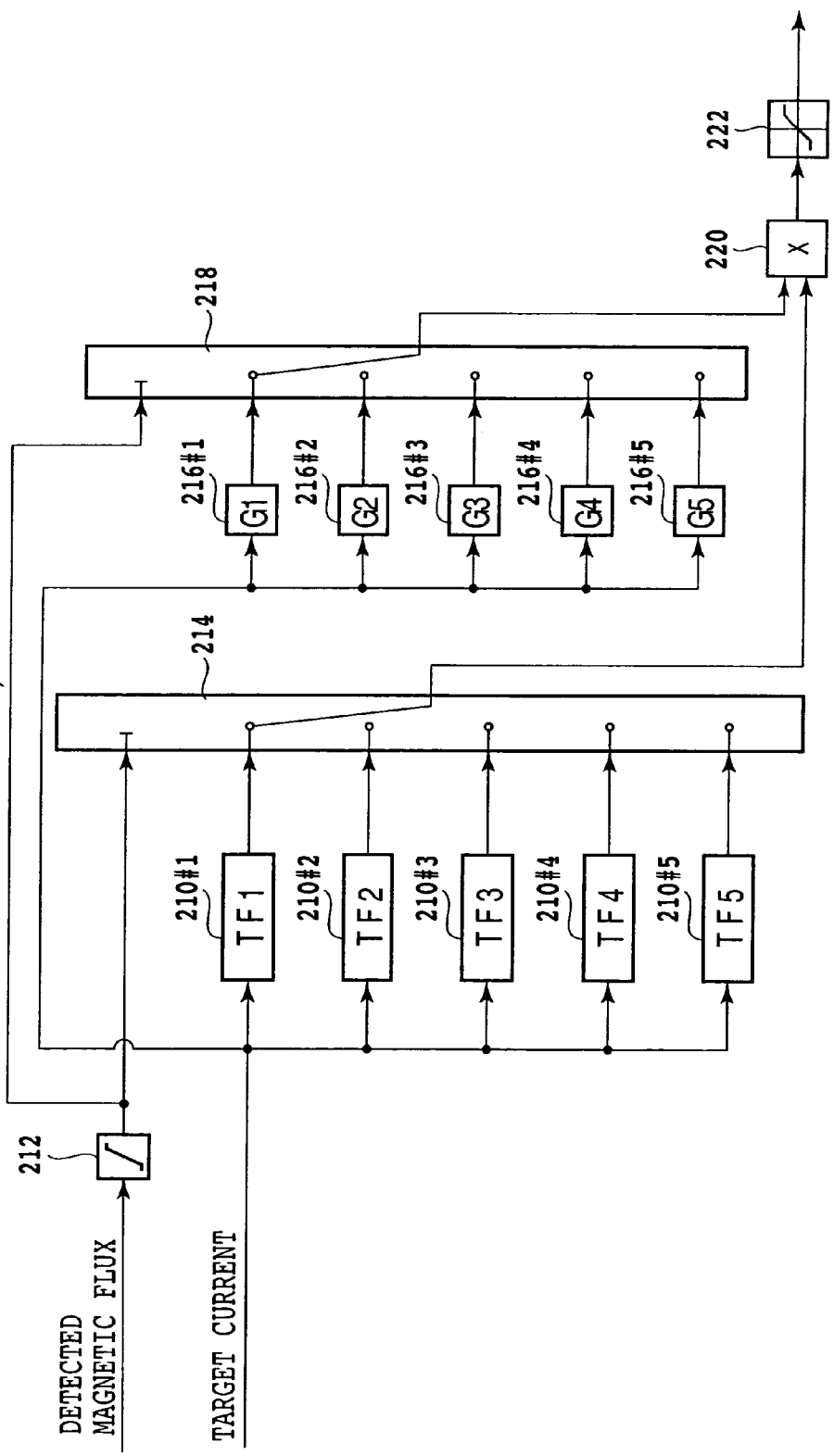
FIG. 15 is a block diagram showing a specific configuration of a feedforward controller shown in FIG. 13.

FIG. 15 shows a specific configuration of the feedforward controller 180 shown in FIG. 13. The feedforward controller 180 has five transfer functions 210#1 to 210#5 and five gains 216#1 to 216#5. The values of the transfer functions 210#1 to 210#5 are arranged in ascending order, wherein the transfer function 210#1 smallest in value is selected when the initial gap is large, and the transfer functions 210#2 to 210#5 are stepwise selected with a decrease in the initial gap. Similarly, the values of the gains 216#1 to 216#5 are arranged in ascending order, wherein the gain 216#1 smallest in value is applied when the initial gap is large, and the gains 216#2 to 216#5 are stepwise applied with a decrease in the initial gap.

The magnetic flux intensity detected by the search coil 66 is converted into an initial gap by a magnetic flux density—initial gap conversion map 212. A multipoint switch 214 selects an optimum transfer function, e.g., the transfer function 210#2 according to the initial gap obtained by the map 212, and a multipoint switch 218 selects the gain 216#2 corresponding to the transfer function 210#2.

The value of the target current is multiplied by the value of the selected transfer function 210#2, and the resultant product is supplied to a multiplier 220. Similarly, the value of the target current is multiplied by the value of the selected gain 216#2, and the resultant product is supplied to the multiplier 220. Then, these products on the transfer function 210#2 and the gain 216#2 are multiplied together by the multiplier 220, and the resultant product is output through a limiter 222.

Figure 14:
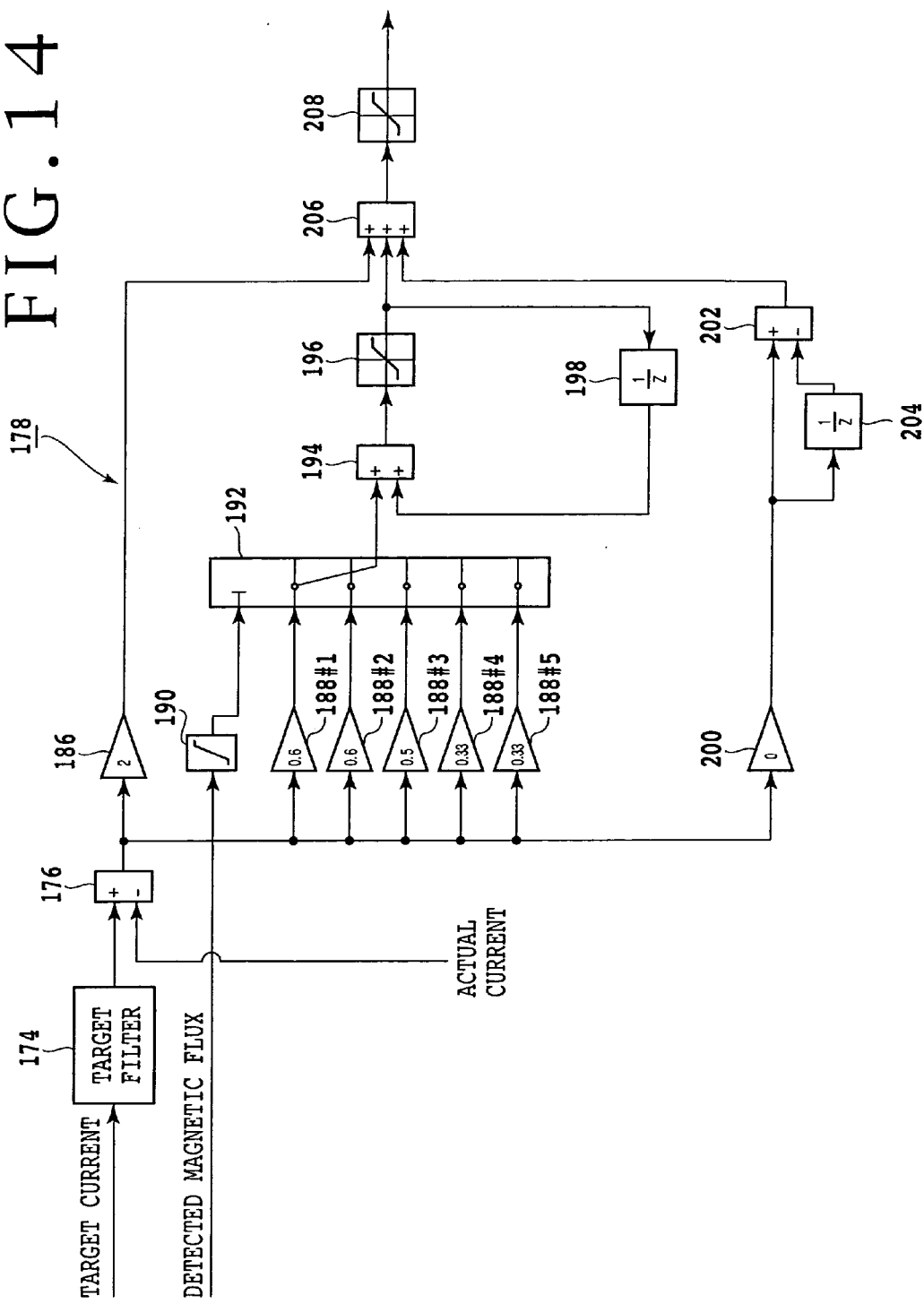
FIG. 14 is a block diagram showing a specific configuration of a PID controller shown in FIG. 13.

The output from the multiplier 220 and the output from the adder 206 shown in FIG. 14 are supplied to the adder 182 shown in FIG. 13 and added together by the adder 182. Then, the PWM duty signal is generated by the PWM duty signal generating means 184 according to the sum output from the adder 182. In the feedforward controller 180 according to this preferred embodiment, a small transfer function and a small gain are selected when the initial gap is large, and larger transfer functions and larger gains are stepwise selected with a decrease in the initial gap due to wearing of the multiplate clutch 52.

The inductance component of the solenoid 60 is small when the initial gap is large, and increases with a decrease in the initial gap due to wearing of the multiplate brake 52. Accordingly, the rising response characteristic of the actual current is degraded with a decrease in the initial gap. To cope with this problem, larger transfer functions and larger gains are stepwise selected with a decrease in the initial gap to feedforward control the target current. As a result, the rising response characteristic of the actual current can be improved irrespective of the magnitude of the initial gap.

In the preferred embodiment mentioned above, the PID controller 178 selects an optimum one of the plural integral term constants according to the initial gap, and the feedforward controller 180 selects an optimum one of the plural transfer functions and an optimum one of the plural gains according to the initial gap.

The electromagnetic actuator control device according to the present invention is not limited to the above preferred embodiment, but various modifications may be made within the scope of the present invention. For example, each of the transfer function and the gain in the feedforward controller 180 may be fixed to a set value, and the integral term constant in the PID controller 178 may be changed according to the initial gap. Alternatively, the integral term constant in the PID controller 178 may be fixed to a set value, and the transfer function and the gain in the feedforward controller 180 may be changed according to the initial gap.

Figure 16:
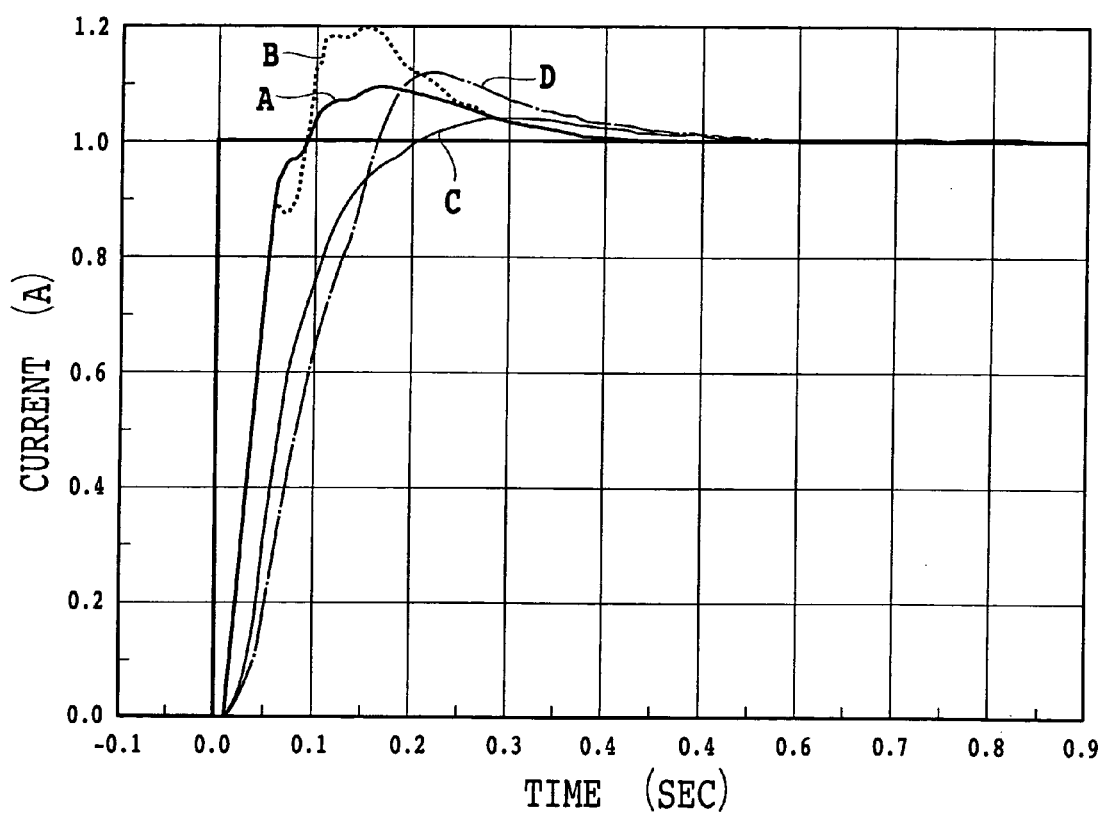
FIG. 16 is a graph showing current rising characteristics in the present invention and in the prior art in the case that an indicated torque is 0–120 kgf·m.

FIG. 16 shows current rising characteristics in the preferred embodiment of the present invention and in the prior art wherein only feedback control is performed in the case that an indicated torque is 0–120 kgf·m. In FIG. 16, the curves A and B show the current rising characteristics according to the present invention in the case that the initial gaps are 1.4 mm and 0.4 mm, respectively. On the other hand, the curves C and D show the current rising characteristics in the prior art in the case that the initial gaps are 1.4 mm and 0.4 mm, respectively. As apparent from FIG. 16, the time required for current rising up to 80% of the target current, i.e., up to 0.8 A is about 50 msec according to each of the curves A and B, which indicates that the rising response characteristic of actual current according to the present invention is excellent over that in the prior art shown by the curves C and D.

Moreover, a larger feedforward control amount is given with a decrease in the initial gap to generate a large overshoot, thereby obtaining a rising response characteristic of actual current improved irrespective of the magnitude of the initial gap. After the actual current quickly rises, it can be quickly made close to the target current by the feedback control.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A device for driving a solenoid, comprising:
   a power supply;
   a switching element connected between said power supply and said solenoid in series therewith;
   a current circulating diode connected in parallel to a series circuit comprising said solenoid so that the cathode of said current circulating diode is connected between said switching element and said solenoid;
   a current detecting circuit for detecting an actual current flowing through said solenoid;
   PID computing means for computing an on-duty value and an off-duty value according to a difference between a target current and said actual current detected by said current detecting circuit, and outputting said on-duty value and said off-duty value;
   PWM duty driving means for generating a PWM duty signal according to inputting of said on-duty value and supplying said PWM duty signal to said switching element to on/off control said switching element; and
   a reverse voltage applying means comprising:
   a second switching element connected between the negative electrode of said power supply and said solenoid in series therewith;
   a second current circulating diode connected in parallel to a series circuit composed of said switching element and said solenoid so that the cathode of said second current circulating diode is connected between said power supply and said switching element;
   an absolute value calculating means for calculating the absolute values of said on-duty value and said off-duty value;
   an inverter for inverting the signs of said on-duty value and said off-duty value;
   a NAND circuit adapted to input an output from said absolute value calculating means and an output from said inverter; and
   a driver circuit for on/off controlling said second switching element according to an output from said NAND circuit, wherein
   said reverse voltage applying means is capable of applying a voltage of said power supply as a reverse voltage to said solenoid according to inputting of said off-duty value when said switching element is off.

2. A device according to claim 1, wherein said PID computing means comprises:
   integral term calculating means for calculating an integral term according to the difference between said target current and said actual current; and
   means for resetting said integral term to 0 when said actual current becomes a predetermined value or less.

3. A device according to claim 1, wherein said power supply comprises a single power supply.

4. A device for driving an electromagnetic actuator including a ringlike core member having an annular groove, an annular solenoid accommodated in said annular groove of said core member, and a ringlike armature member opposed to said core member with a given gap defined therebetween, said device comprising:
   a power supply;
   a switching element connected between said power supply and said solenoid in series therewith;
   a current circulating diode connected in parallel to a series circuit comprising said solenoid so that the cathode of said current circulating diode is connected between said switching element and said solenoid;
   a current detecting circuit for detecting an actual current flowing through said solenoid;
   PID computing means for computing an on-duty value and an off-duty value according to a difference between a target current and said actual current detected by said current detecting circuit, and outputting said on-duty value and said off-duty value;

PWM duty driving means for generating a PWM duty signal according to inputting of said on-duty value and supplying said PWM duty signal to said switching element to on/off control said switching element; and a reverse voltage applying means comprising:

a second switching element connected between the negative electrode of said power supply and said solenoid in series therewith;

a second current circulating diode connected in parallel to a series circuit composed of said switching element and said solenoid so that the cathode of said second current circulating diode is connected between said power supply and said switching element;

absolute value calculating means for calculating the absolute values of said on-duty value and said off-duty value;

an inverter for inverting the signs of said on-duty value and said off-duty value;

a NAND circuit adapted to input an output from said absolute value calculating means and an output from said inverter; and a driver circuit for on/off controlling said second switching element according to an output from said NAND circuit, wherein said reverse voltage applying means is capable of applying a voltage of said power supply as a reverse voltage to said solenoid according to inputting of said off-duty value when said switching element is off.

5. A device according to claim 4, wherein said PID computing means comprises:

integral term calculating means for calculating an integral term according to the difference between said target current and said actual current; and means for resetting said integral term to 0 when said actual current becomes a predetermined value or less.

6. A device according to claim 4, wherein said power supply comprises a single power supply.

7. A control device for an electromagnetic actuator including a core member having a groove, a solenoid accommodated in said groove of said core member, and an armature member opposed to said core member with a gap defined therebetween, said control device comprising:

gap detecting means for detecting said gap between said core member and said armature member;

current detecting means for detecting an actual current flowing through said solenoid;

a feedback controller for feedback controlling said actual current so that said actual current becomes equal to a target current;

a feedforward controller for feedforward controlling said target current; and solenoid drive signal generating means for generating a solenoid drive signal according to outputs from said feedback controller and said feedforward controller;

said feedback controller changing an integral term constant according to said gap detected by said gap detecting means;

said feedback controller selects one of a plurality of predetermined integral term constants according to said gap detected by said gap detecting means; whereby said feedback controller selects a larger one of said integral term constants when said gap is large, and selects a smaller one of said integral term constants when said gap becomes smaller.

8. A control device according to claim 7, wherein said feedforward controller changes a transfer function and/or a gain according to said gap detected by said gap detecting means.

9. A control device according to claim 8, wherein said feedforward controller selects one of a plurality of predetermined transfer functions and/or one of a plurality of predetermined gains according to said gap detected by said gap detecting means.

10. A control device according to claim 9, wherein said feedforward controller selects a smaller one of said transfer functions and/or a smaller one of said gains when said gap is large, and selects a larger one of said transfer functions and/or a larger one of said gains when said gap becomes smaller.

11. A control device according to claim 7, wherein said gap detecting means comprises a magnetic flux sensor for detecting a magnetic flux intensity generated from said solenoid.

12. A control device according to claim 7, further comprising a target filter provided on the front stage of said feedback controller and adapted to input said target current.

13. A control device for an electromagnetic actuator including a core member having a groove, a solenoid accommodated in said groove of said core member, and an armature member opposed to said core member with a gap defined therebetween, said control device comprising:

gap detecting means for detecting said gap between said core member and said armature member;

current detecting means for detecting an actual current flowing through said solenoid;

a feedback controller for feedback controlling said actual current so that said actual current becomes equal to a target current;

a feedforward controller for feedforward controlling said target current; and solenoid drive signal generating means for generating a solenoid drive signal according to outputs from said feedback controller and said feedforward controller;

said feedforward controller changing a transfer function and/or a gain according to said gap detected by said gap detecting means;

said feedforward controller selects one of a plurality of predetermined transfer functions and/or one of a plurality of predetermined gains according to said gap detected by said gap detecting means, whereby said feedforward controller selects a smaller one of said transfer functions and/or a smaller one of said gains when said gap is large, and selects a larger one of said transfer functions and/or a larger one of said gains when said gap becomes smaller.

14. A control device according to claim 13, wherein said gap detecting means comprises a magnetic flux sensor for detecting a magnetic flux intensity generated from said solenoid.

15. A control device according to claim 13, further comprising a target filter provided on the front stage of said feedback controller and adapted to input said target current.

* * * * *